US008126457B2

(12) United States Patent
Preiss et al.

(10) Patent No.: US 8,126,457 B2
(45) Date of Patent: *Feb. 28, 2012

(54) METHOD AND SYSTEM FOR PROVISIONING SERVICES IN A TELECOMMUNICATIONS NETWORK

(75) Inventors: Bruno Preiss, Waterloo (CA); Daniel Wilk, Toronto (CA)

(73) Assignee: Wi-LAN, Inc., Ottawa (CA)

( * ) Notice: Subject to any disclaimer, the term of this patent is extended or adjusted under 35 U.S.C. 154(b) by 640 days.

This patent is subject to a terminal disclaimer.

(21) Appl. No.: 12/028,326

(22) Filed: Feb. 8, 2008

(65) Prior Publication Data

US 2008/0214173 A1 Sep. 4, 2008

Related U.S. Application Data

(63) Continuation of application No. 10/476,619, filed as application No. PCT/CA2002/000602 on Apr. 25, 2002, now Pat. No. 7,333,810.

(30) Foreign Application Priority Data

May 2, 2001 (CA) ..................................... 2346158

(51) Int. Cl.
*H04W 4/00* (2009.01)
(52) U.S. Cl. ..................... 455/432.3; 455/407; 455/433; 455/435.1; 455/414.1
(58) Field of Classification Search .................. 455/3.01, 455/462, 465, 560, 426.1, 405, 426.2, 423, 455/424, 425, 561, 552.1, 557, 407, 432.3, 455/433, 435.1, 414.1; 370/241
See application file for complete search history.

(56) References Cited

U.S. PATENT DOCUMENTS

| | | | |
|---|---|---|---|
| 5,440,620 | A | 8/1995 | Slusky |
| 5,592,541 | A | 1/1997 | Fleischer, III et al. |
| 5,819,177 | A | 10/1998 | Vucetic et al. |
| 5,887,249 | A | 3/1999 | Schmid |
| 6,125,126 | A | 9/2000 | Hallenstål |
| 6,188,899 | B1 | 2/2001 | Chatterjee et al. |
| 6,333,676 | B1 | 12/2001 | Neffling |
| 6,496,694 | B1 | 12/2002 | Menon et al. |
| 6,980,637 | B2 | 12/2005 | Bhusri |
| 7,065,188 | B1 | 6/2006 | Mei et al. |
| 7,088,987 | B1 | 8/2006 | Espejo et al. |
| 7,333,810 | B2 * | 2/2008 | Preiss et al. ................ 455/432.3 |
| 2002/0059449 | A1 | 5/2002 | Wandel et al. |
| 2002/0137504 | A1 | 9/2002 | Engholm et al. |

FOREIGN PATENT DOCUMENTS

| | | |
|---|---|---|
| JP | 08-506471 A | 7/1996 |
| JP | 08-223615 A | 8/1996 |
| JP | 08-256120 A | 10/1996 |
| JP | 09-187062 A | 7/1997 |
| JP | 2001-061009 A | 3/2001 |
| WO | WO 00/67494 A1 | 11/2000 |
| WO | WO 00/67949 A1 | 11/2000 |

* cited by examiner

*Primary Examiner* — Dominic E Rego
(74) *Attorney, Agent, or Firm* — Procopio, Cory, Hargreaves & Savitch LLP (57) ABSTRACT

The present invention is a telecommunication system, comprising of at least one base station connected to a telecommunication network, a plurality of subscriber stations each cooperating with the base station to establish a connection between a user device operably connected to the subscriber station and the telecommunication network. The base station is also connected with a subscriber database to maintain the subscriber records that contain provisioning information for services, features and account information, and an interactive response system operable to create and modify a subscriber record in the subscriber database in response to input received over the connection from a subscriber using the user device to select services, features and account information for the subscriber station.

43 Claims, 7 Drawing Sheets

METHOD AND SYSTEM FOR PROVISIONING SERVICES IN A TELECOMMUNICATIONS NETWORK

This is a continuation of U.S. patent application Ser. No. 10/476,619, filed Apr. 30, 2004, the contents of which are incorporated herein by reference.

FIELD OF THE INVENTION

The present invention relates to a method, system and apparatus for provisioning services in a telecommunications network such as a wireless telecommunications services, or the like. More specifically, the present invention relates to provisioning new subscribers, or new services for existing subscribers, within a telecommunications network.

BACKGROUND OF THE INVENTION

Provisioning a new subscriber on a telecommunications network requires that the subscriber be allocated network resources (ports, bandwidth, voice mail boxes, a telephone number, etc.) and granted permission to access and use the network and/or service.

Provisioning a new subscriber can be an expensive undertaking for a telecommunications carrier and an inconvenient process to the new subscriber. For example, to activate traditional telephone service, a subscriber needs to visit a service center or call the telephone carrier from an already established line to request the service, provide billing and credit information, select optional telephone services like call forwarding or call waiting, and find out what the assigned telephone number for the new line will be. The carrier needs to operate service and/or call-centers and have agents to collect and manually enter this subscriber information into their systems. In all likelihood, activities by several different employees will be required to actually provision the service.

For a wireless system, such as a PCS or cellular phone, the process of provisioning a new subscriber is even more complicated. A new subscriber first purchases the cellular phone, typically at a service kiosk or sales outlet. At this time, the vendor has to collect billing and credit information and the wireless telephone is programmed with its telephone number and service features. The serial number, EIN or other identifier of the wireless telephone is programmed into the wireless network to allow that particular telephone to access the network.

A number of different innovations attempting to improve the process of provisioning new telephony services are known.

For example, U.S. Pat. No. 5,297,191 (Gerszberg) describes a method of downloading provisioning parameters into a wireless telephone set. The method uses dual tone multi-frequency (DTMF) tones transmitted from the base station to program in authorization codes and/or to activate new features. While this system could reduce some of the cost of provisioning, it is limited in practice to provisioning services and features which are already programmed into the wireless telephone set.

U.S. Pat. No. 5,485,505 (Norman, et al.) teaches a method to reduce a carrier's cost by programming a sequence of provisioning questions into the wireless telephone set itself. Upon activation, the telephone set prompts the subscriber for information based upon the programming. The wireless telephone then transmits the subscriber's answers to the wireless base station. While this method may obviate some of the costs of activation, the carrier's ability to change or update its activation methods rapidly is lost since the software to implement the process is preprogrammed into telephones already out in the market.

U.S. Pat. No. 5,551,073 (Sammarco) describes a wireless telephone set that is operable in two modes: an operations mode and a setup mode. During setup mode, a user can enter authentication information into the phone set that will enable the telephone to be used in operations mode. Again, this method restricts the carrier's ability to change its activation methods as the activation prompts and processes are preprogrammed and stored in the phones themselves.

The Telecommunications Industry Association (TIA) has published IS-683 (also known as PN-3889), a standard to allow over-the-air service provisioning (OTASP). OTASP works by temporarily provisioning a wireless telephone set to allow a subscriber to call a customer service center where long-term provisioning can be obtained. IS-683 allows carriers to centralize their operations, but still requires agent involvement in the activation process as the process merely mimics the connected land-line process.

Each of the above prior art techniques suffers from disadvantages in the efficiency, flexibility and/or cost of implementing the technique. It is therefore desired to have a system, apparatus and method to provision telecommunications services in a more efficient, flexible, simple (to the end user) and/or cost effective manner.

SUMMARY OF THE INVENTION

It is an object of the present invention to provide a novel system, apparatus and method for provisioning services in a telecommunications network which obviates or mitigates at least some of the above-identified disadvantages of the prior art.

According to a first aspect of the present invention, there is provided a telecommunication system, comprising of at least one base station connected to a telecommunication network, a plurality of subscriber stations each cooperating with the base station to establish a connection between a user device operably connected to the subscriber station and the telecommunication network. The base station is also connected with a subscriber database to maintain the subscriber records that contain provisioning information for services, features and account information, and an interactive response system operable to create and modify a subscriber record in the subscriber database in response to input received over the connection from a subscriber using the user device to select services, features and account information for the subscriber station.

According to another aspect of the present invention, there is provided a telecommunications system operable to download program code from the base station to the subscriber stations. The program code can update existing code or provide new features to the subscriber station.

According to another aspect of the present invention, there is provided a method for configuring a subscriber record representing services, features and account information for a subscriber station in a telecommunication system, comprising the steps of: (i) a user of the subscriber station connecting a user device the said subscriber station and powering up the subscriber station; (ii) the subscriber station broadcasting an announcement message across the connection to the base station; (iii) the base station receives the announcement message; (iv) the base station initiating an interactive response system call to the subscriber station across the connection; (v) the user answering the call using the user device; (vi) initiating a session with the interactive response system to configure the subscriber record in response to user input; and (vii) updating the subscriber record in the subscriber database to provide the selected services and features.

Preferably, the interactive response session can configure service for more than one phone line upon a call.

According to another aspect of the present invention, there is provided a method for providing technical support to the user, comprising the steps of: (a) the subscriber station recording diagnostics information; (b) the subscriber station transmitting the diagnostics information to the base station; (c) the base station transmitting the diagnostics information to the interactive response system; (d) the interactive response system providing responses based upon the diagnostics information.

One aspect of the present invention relates to a wireless local loop system that can provision services or features to a user by having the subscriber station automatically communicate with the base station to set up an IVR-based activation call. During the activation call session, the subscriber can set up his or her services and options. Also during the activation call session, transmission reception information can be transmitted between the subscriber station and the base station and this transception information can be used to provide technical assistance to the user via the outputs of the IVR system.

BRIEF DESCRIPTION OF THE DRAWINGS

Preferred embodiments of the present invention will now be described, by way of example only, with reference to the attached Figures, wherein.

DETAILED DESCRIPTION OF THE PREFERRED EMBODIMENTS

Figure 1:
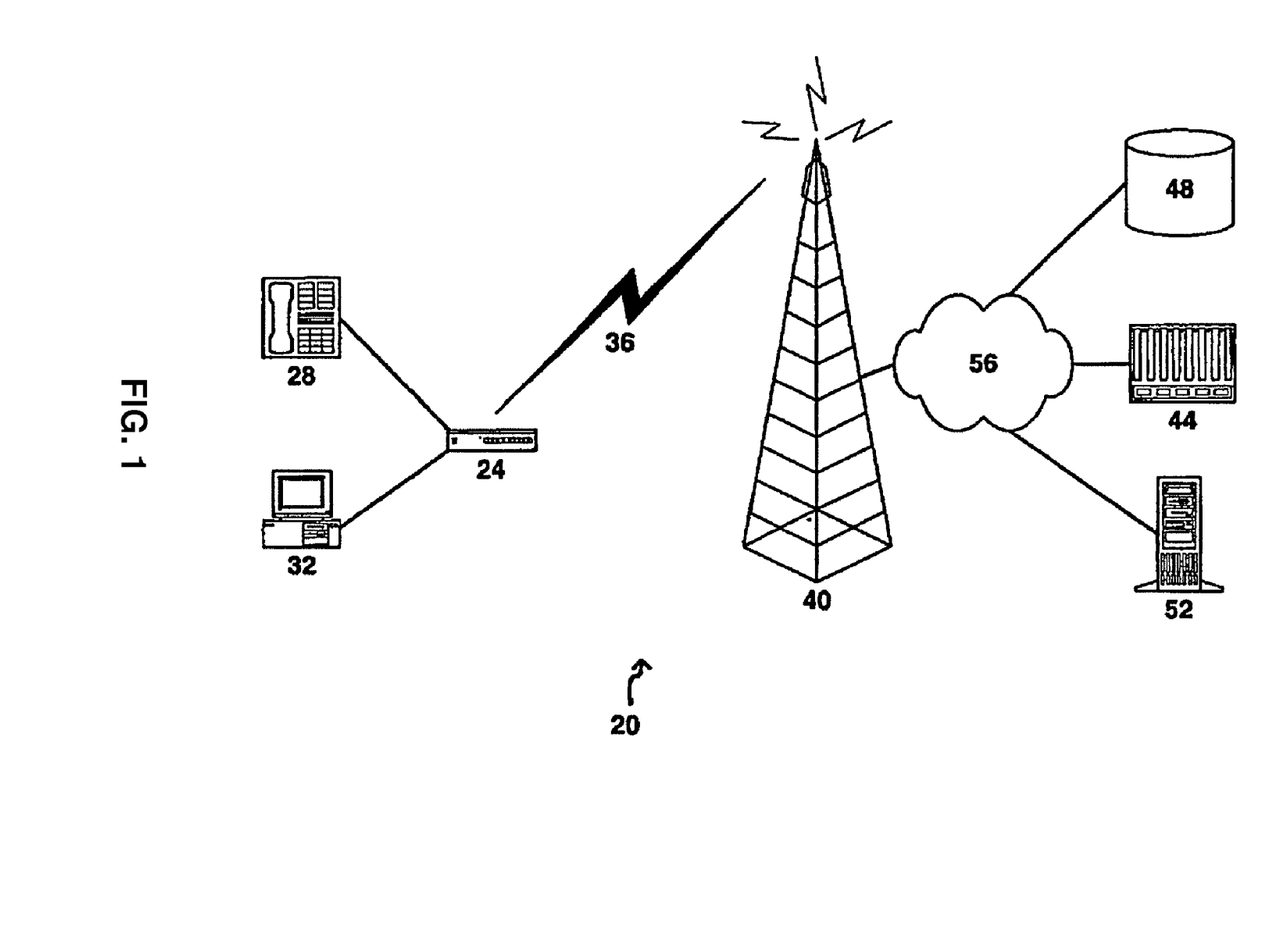
FIG. 1 shows a schematic representation of a wireless local loop system in accordance with an embodiment of the present invention.

Referring now to FIG. 1, a wireless local loop (WLL) system is indicated generally at 20. System 20 includes a subscriber station 24 that can connect to one or more user devices, which can be telephony devices 28, such as telephones, facsimile machines, etc. and data devices 32, such as a personal computers, personal digital assistants, web cameras, etc. Subscriber station 24 is operable to communicate, via a connection, such as radio link 36, with a base station 40.

Base station 40 is operable to connect with an interactive response system, such as IVR system 44, a subscriber database 48, and a code server 52, all via a backhaul network 56. Backhaul network 56 is also operable to connect to the public Internet and the public switched telephone network (PSTN) via the appropriate gateways (not shown). As system 20 can provide voice and data services to subscribers, it is also sometimes referred to as a wireless DSL, or wDSL, system.

While the following discussion concentrates on a wireless (radio-based) local loop telecommunications system, the present invention can be utilized with other advanced local loop telecommunications systems, such as those employing DSL over PSTN land lines or cable modem (CATV) links and such systems are not intended to be excluded from the scope of the invention.

In a present embodiment, each subscriber station 24 is not intended to be used as a mobile device and is instead used at a fixed location, generally within a subscriber's premises. However, it is also contemplated that the present invention can be applicable, with appropriate modifications, to nomadic (moved between uses) and/or mobile (moved during use) subscriber stations.

Figure 2:
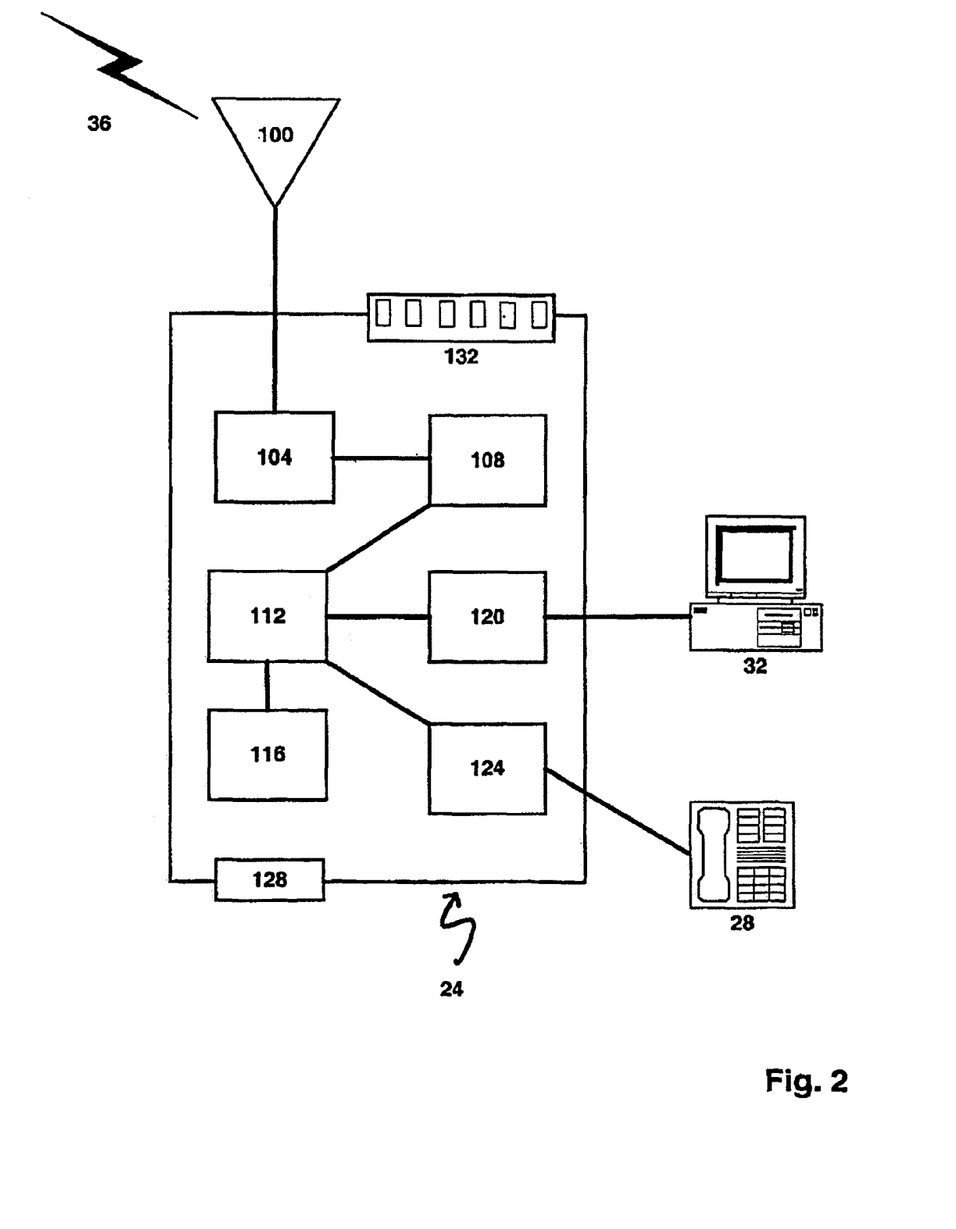
FIG. 2 shows a schematic representation of a subscriber station in the system of FIG. 1.

Referring now to FIG. 2, subscriber station 24 is shown in greater detail. Subscriber station 24 includes an antenna 100 for receiving and transmitting communications over radio link 36. In the present embodiment, antenna 100 is an electrically steerable antenna, but other types of antenna are also within the scope of the invention. In turn, antenna 100 is connected to a radio 104 and a modem 108, which are in turn connected to a microprocessor-assembly 112. Microprocessor-assembly 112 which can include, for example, a StrongARM processor manufactured by Intel, performs a variety of functions, including implementing A/D-D/A conversion, voice codecs, filters, encoders, data compressors and/or decompressors and packet assembly/disassembly. Connected to microprocessor-assembly 112 is storage unit 116. Storage unit 116 can be a nonvolatile memory module, such as Flash RAM or a disk drive, and is operable to contain program code and data required by microprocessor-assembly 112.

As shown in FIG. 2, microprocessor-assembly 112 interconnects modem 108 with a data port 120 and one or more telephony ports 124. Accordingly, microprocessor-assembly 112 is operable to process voice services for a telephony device 28 connected to telephony port 120, and data services for a data device 32 when connected to computer port 120. In the present embodiment, telephony port 124 is an RJ-11 jack and data port 120 is an RJ-45 jack, however other possible configurations will be apparent to those of skill in the art. For example, data port 120 can be a USB port, or a Bluetooth or IEEE 802.11 radio data port.

Also, in the present embodiment, subscriber station 24 contains four telephony ports 120, with only one being shown in FIG. 2 for clarity, but other numbers of telephony ports 120 are within the scope of the invention. Subscriber station 24 also includes a power controller 128 that can be connected to a power source (not shown). In the present embodiment, power controller 128 consists of a power cable, an on/off switch, and, optionally, an emergency battery, but other configurations of power controller 128 are within the scope of the invention. It is contemplated that subscriber station could also contain one or more light-emitting diodes (LEDs) 132 visible on the exterior of the unit. LEDs 132 are operable to display visual indicators of the operations of aspects of network 20 (such as data transfer rate, received signal strength, and unit power).

Radio link 36, which can be divided into various communications channels, can be established between a base station 40 and one or more of a plurality of subscriber stations 24. In a present embodiment, radio link 36 is a synchronized wireless link, employing a slotted frame structure similar to that described in the channel definition documents of the 3GPP organization, and available at their web site www.3gpp.org and from various other sources.

Utilizing one or more communication channels, radio link 36 allows information to be transferred between base station 40 and respective subscriber stations 24, as needed. In a present embodiment, the radio-communication multiple access technique employed over radio link 36 is wideband CDMA, however, other types of techniques, such as GSM, FDMA, OFDM, or TDMA are also within the scope of the invention. In the present embodiment, communications over radio link 36 are achieved via packets. The particular implementation/type of packet communication employed is not particularly limited, and can include IP (with TCP, UDP and/or RTP) and/or modifications thereof, ATM or any other implementations as will occur to those of skill in the art.

Figure 3:
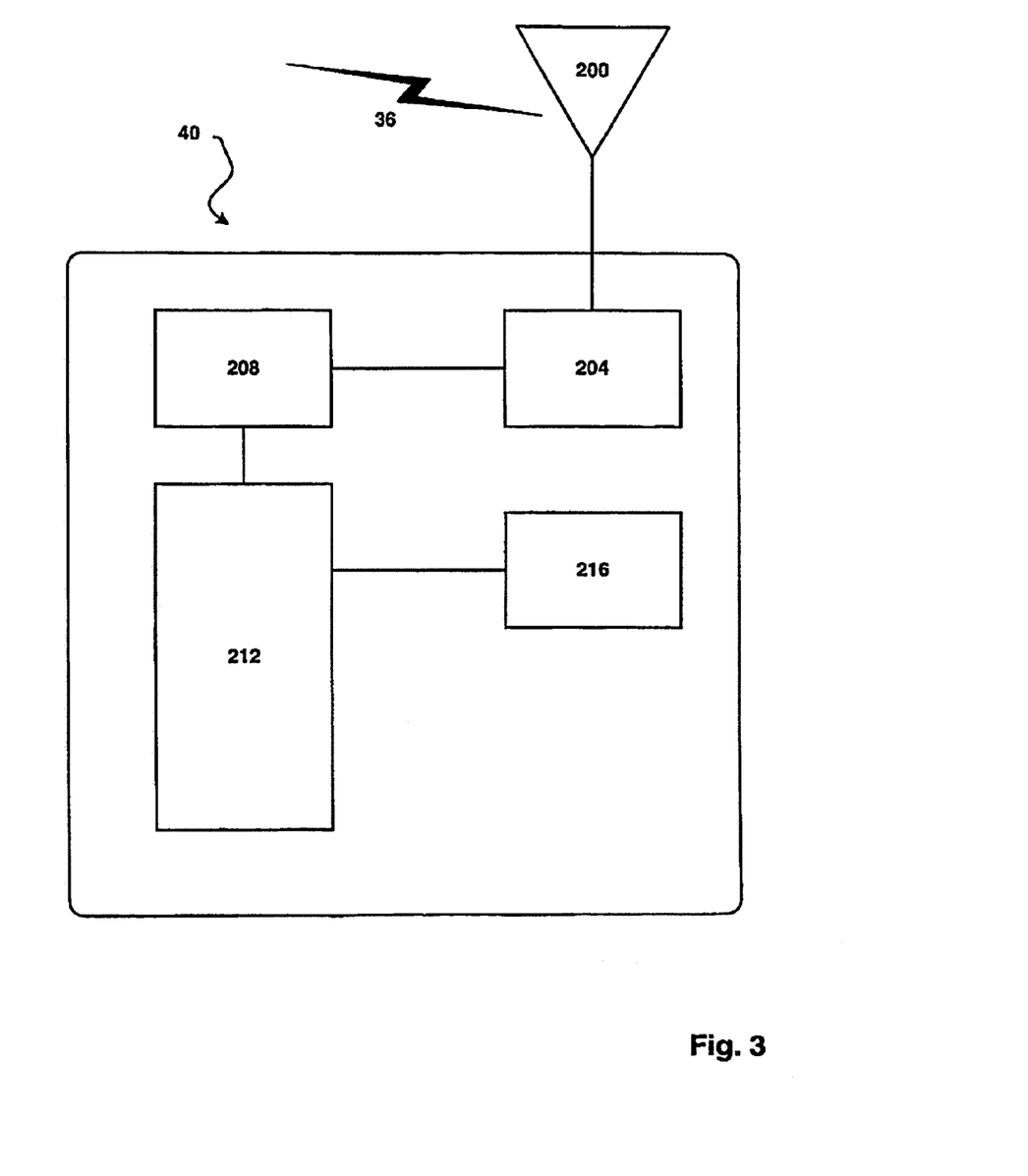
FIG. 3 shows a schematic representation of a base station in the system of FIG. 1.

FIG. 3 shows base station 40 in greater detail. Base station 40 comprises of an antenna 200 for receiving and transmitting radio communications over radio link 36. As will be apparent to those of skill in the art, antenna 200 can comprise a single element or multiple elements, if a transmission diversity scheme is employed. In turn, antenna 200 is connected to a radio 204 and a modem 208. Modem 208 is connected to a microprocessor-router assembly 212. Microprocessor-router assembly 212 contains a suitable microprocessor, such as a Pentium III processor system manufactured by Intel, one or more digital signal processors (DSPs), etc. It will be understood that microprocessor-router assembly 212 can include multiple microprocessors, as desired. The router within microprocessor-router assembly 212 is connected to backhaul network 56 in any suitable manner. Attached to microprocessor-router assembly 212 is storage unit 216. Storage unit 216 is a nonvolatile memory module, such as a computer hard drive or Flash memory, and is operable to contain program code and data required by microprocessor-router assembly 212. Other configurations of base station 40 will occur to those of skill in the art.

System 20 can have additional base stations 40, as desired, and communications between multiple base stations 40 and subscriber stations 24 can be managed using known handoff techniques. Other known wireless architectures can be employed. For example, base station 40 can be multi-sectored, each sector being defined by directional antennas, and each sector comprising a different reception footprint, thus allowing reuse of available radio spectrum between sectors serviced from a single base station 40.

Returning now to FIG. 1, an interactive response system, IVR system 44 consists of a conventional Interactive Voice Response (IVR) system. As is known to those of skill in the art, an IVR system is a computer-driven system capable of generating audio messages based upon, and in response to, subscriber responses. The audio messages can be prerecorded voice messages or synthesized text-to-speech messages. Subscriber responses are typically DTMF tones generated on the user's telephony device 28, but can also include other types of subscriber responses such as speech (when IVR system 44 is connected to a voice recognition unit). The collective series of audio messages transmitted to subscriber station 24 and DTMF tones transmitted to IVR system 44 can be referred to as an IVR session. IVR system 44 is capable of providing IVR services to one or more of a plurality of base stations 40 and can preferably support multiple IVR sessions concurrently. Also known to those of skill in the art, IVR system 44 can be operable to transmit and receive data from other types of computer systems, typically databases. An example of a suitable IVR system would be Nortel Network's Periphonics IVR system. Other suitable interactive response systems and configurations will be apparent to those of skill in the art. For example, IVR system 44 could be a suitable computer that processed VoiceXML scripts to create the IVR content.

Subscriber database 48 can consist of any commonly known database system that can be employed to store provisioning information for services, features and account information in subscriber records. Subscriber database 48 is capable of providing database services to one or more of a plurality of base stations 40. An example of a known database system would be a Sun Microsystems E450 computer running Oracle 8i database software. Other database configurations will be apparent to those of skill in the art. Database services are provided using known methods and protocols, such as LDAP or XML. Other protocols are within the scope of the invention.

Code server 52 consists of a computer operable to contain and propagate program code changes and/or additions in system 20. Code server 52 is capable of propagating code changes and/or new code to one or more of a plurality of base stations 40. Code is transmitted to base station 40 over backhaul network 56. An example of a code server 52 is a Sun Microsystems Ultra Sparc 5 computer, although other code server 52 configurations will be apparent to those of skill in the art.

It is contemplated that a single subscriber database 48 and/or code server 52 can serve multiple base stations 40 in system 20, or that subscriber database 48 and/or code server 52 can be replicated and/or distributed within system 20 as desired.

Backhaul network 56 interconnects base station 40 with subscriber database 48, code server 52 and IVR system 44 in any suitable manner. Backhaul network 56 can interface and interconnect to the PSTN via a PSTN gateway (not shown) and/or to a packet switched data network, such as the Internet (not shown) via an appropriate router. Depending upon the amount of data traffic to be transferred, backhaul network 56 can comprise one or more T1, T3, E1, E3, OC3, microwave, satellite or other suitable telecommunication links connected by one or more routers or other types of networking equipment, as will occur to those of skill in the art.

It is contemplated that, with the present invention, a subscriber station 24 can be sold to a new subscriber without requiring provisioning for the services to that subscriber to be performed at the time of sale. This allows, for example, a subscriber station 24 to be purchased by a new subscriber from a mass marketing outlet, or department store, or ordered online and delivered by a parcel delivery service, etc.

In accordance with a present embodiment of the invention, a method of provisioning a subscriber to system 20 will now be described with reference to the flowcharts shown in FIGS. 3 through 7. Initial provisioning of a subscriber station 24 occurs in two stages: connection and service configuration. First, a connection between subscriber station 24 and base station 40 is established. The connection between subscriber station 24 and base station 40 is described in more detail with reference to FIGS. 4a and 4b. After the connection between subscriber station 24 and base station 40 is established, service configuration occurs. Service configuration is described in more detail with reference to FIG. 5.

Figure 4A:
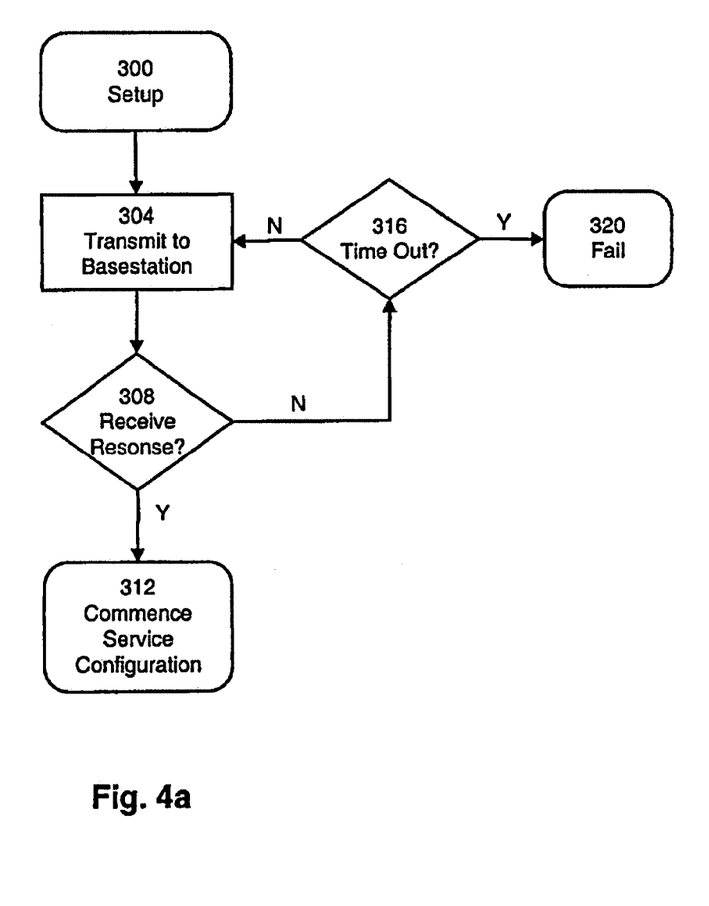
FIG. 4a shows a flowchart of a method for connecting a subscriber to a network, with reference to a subscriber station, in accordance with an embodiment of the present invention.

Referring now to FIG. 4a, the method of establishing a connection between subscriber station 24 and base station 40 commences at step 300 when the new subscriber first powers up a properly setup subscriber station 24 (i.e.—telephony device 28 is attached to telephony port 120 and a power controller 128 is connected and turned on). The properly set-up subscriber station 24 initializes (boots up), and performs a power-on self test and similar initialization activities.

The method advances to step 304 where subscriber station 24 transmits a message announcing its presence to any base station 40 that can service it via a predefined channel of radio link 36. The announcement message contains the serial number, or other unique identifier, of subscriber station 24. The actual method of acquiring base station 40 to service subscriber station 24 and the predefined channel structure employed to transmit the announcement is not particularly limited and, in a present embodiment of the invention, uses a system such as that taught in the above-mentioned 3GPP system and its RACH channel. Other methods for subscriber station 24 to announce its presence to base station 40 will occur to those of skill in the art.

The method advances to step 308 where subscriber station 24 checks to see if it receives an appropriate response from base station 40 within a predetermined time out period. If no appropriate response is received before the predetermined time out period elapses, the method advances to step 316 where appropriate remedial steps can be taken.

If an appropriate response is received, the process proceeds to step 312 where service configuration for the subscriber begins. The method for subscriber configuration is described in more detail with reference to FIG. 6.

At step 316, subscriber station 24 checks to see if a predetermined maximum number of connection attempts have occurred since its initialization (at step 300). If the predetermined maximum number of connection attempts have occurred, the method moves to step 320.

At step 320, attempts to connect subscriber station 24 to base station 40 have failed and the method ends. It is contemplated that subscriber station 24 would indicate this failure to the subscriber by triggering a visual display in LEDs 132. It is also contemplated that the method of indicating a connection failure in step 320 can be by means of an audio signal in subscriber station 24. It is contemplated that another alternative is for subscriber station 24 to ring telephony device 28 and play a prerecorded message (stored in storage unit 116) upon pickup of telephony device 28.

If, at step 320 it is determined that a predetermined number of connection attempts have not occurred, the method returns to step 304. Subscriber station 24 will retransmit a message announcing its presence to any base station 40 that can service it via a predefined channel of radio link 36. It is presently contemplated that known techniques of improving transmission characteristics can be used after a pre-selected number of connection attempts have failed to increase the likelihood of the message to properly received by the base station 40. An example of a known technique of improving transmission characteristics would be to increase the transmission power of the signal and this power increase can be employed, for example, after four failed connection attempts. Other examples of improved transmission characteristics include changing modulation schemes (e.g.—from 16-QAM to QPSK) increasing the redundancy provided by error correcting codes (e.g. from a ⅔ code rate to a ¼ code rate), etc.

Figure 4B:
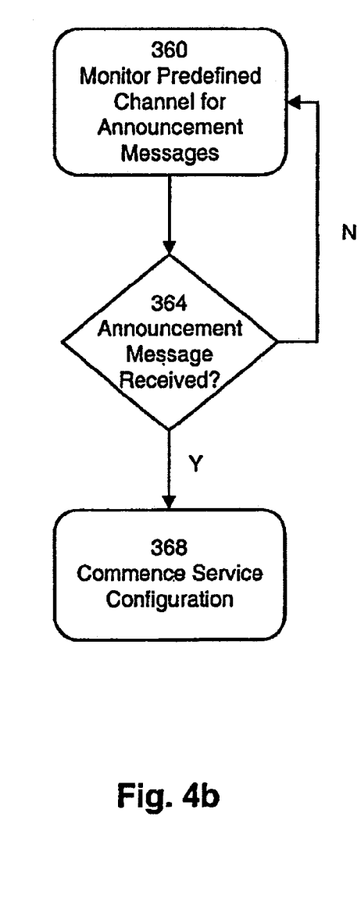
FIG. 4b shows a flowchart of a method for connecting a subscriber to a network with reference to a base station, in accordance with an embodiment of the present invention.

Referring now to FIG. 4b, the method at base station 40 to establish a connection between base station 40 and a subscriber station 24 commences at step 360 where base station 40 monitors the predefined channel, or channels, for announcement messages. The actual method of monitoring a predefined channel or channels for announcement messages is not particularly limited and, in a present embodiment of the invention, a radio resource management (RRM) process, running on microprocessor-assembly 212 of base station 40 is listening for announcement messages transmitted on the predefined channel. In the presently preferred embodiment of the invention, step 360 is performed independently of the rest of the method, allowing multiple subscriber stations 24 to be provisioned simultaneously by replicating the other steps of the method as needed and/or permitted by resources in system 20.

The method advances to step 364. If an announcement message is received at base station 24, the method moves to step 368 and the service configuration process is initiated. If no announcement message is received, the method returns to step 360 and the monitoring process continues.

It is contemplated that aspects of the method, as described in FIGS. 4a and 4b can occur synchronously or asynchronously of each other, so that either aspect of the method could begin first and/or that multiple instances of either or both aspects can occur.

Figure 5:
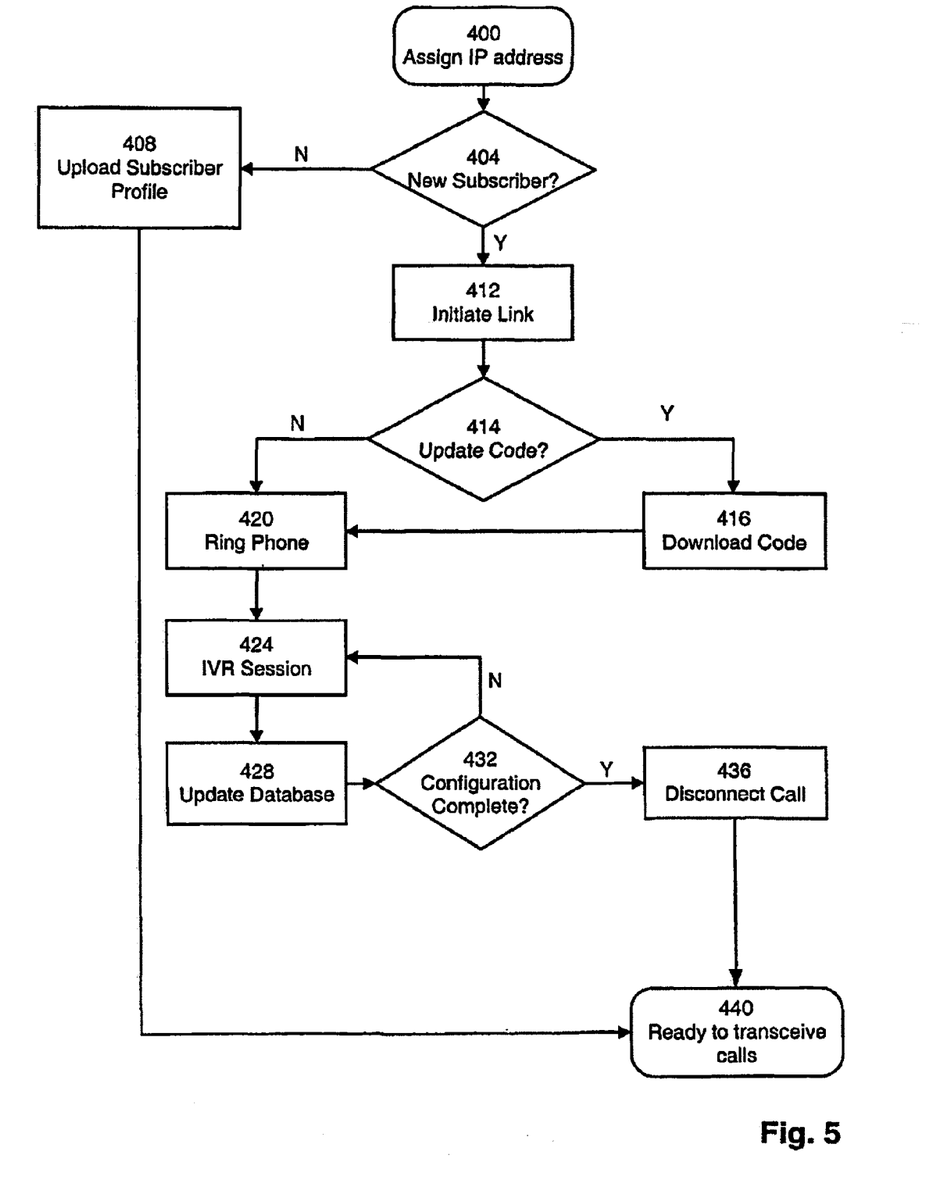
FIG. 5 shows a flowchart of a method for configuring a subscriber, in accordance with an embodiment of the present invention.

FIG. 5 shows a flowchart of a method for service configuration, starting at step 400 where base station 40 assigns an available IP address to the subscriber station 24 detected using the connection method described above. The actual method of assigning an IP address is not particularly limited and, in a present embodiment of the invention, a DHCP server (not shown) is employed.

The method advances to step 404 where base station 40 queries subscriber database 48 via backhaul network 56 with the serial number, or other unique identifier received in the subscriber station's announcement message. If the serial number already exists within the records of subscriber database 48 (indicating that this is not a new subscriber), the method advances to step 408 where base station 40 retrieves the subscriber's profile information from subscriber database 48's records via backhaul network 56 and the method continues at step 440.

If the serial number does not exist within the records of subscriber database 48 (indicating a new subscriber), then the method advances to step 412 where base station 40 opens a channel on radio link 36 which can be a bi-directional channel or which can be a downlink-only channel, in this latter case uplink communication from subscriber station 24 being accomplished with the previously discussed predefined channel, RACH or other channel.

At step 414, base station 40 checks over radio link 36 to see if the program code on subscriber station 24 is up-to-date and complete for the basic services provided by system 20. According to the present embodiment of the invention, the code on subscriber station 24 can be checked according to any established criteria, such as according to the code's version number, time stamp, and/or library modules present on the file system or in memory of subscriber station 24. If base station 40 determines that code needs to be added or modified, for example by comparing the appropriate criteria to tables in code server 52, the method advances to step 416. If not, the method advances to step 420.

Figure 7:
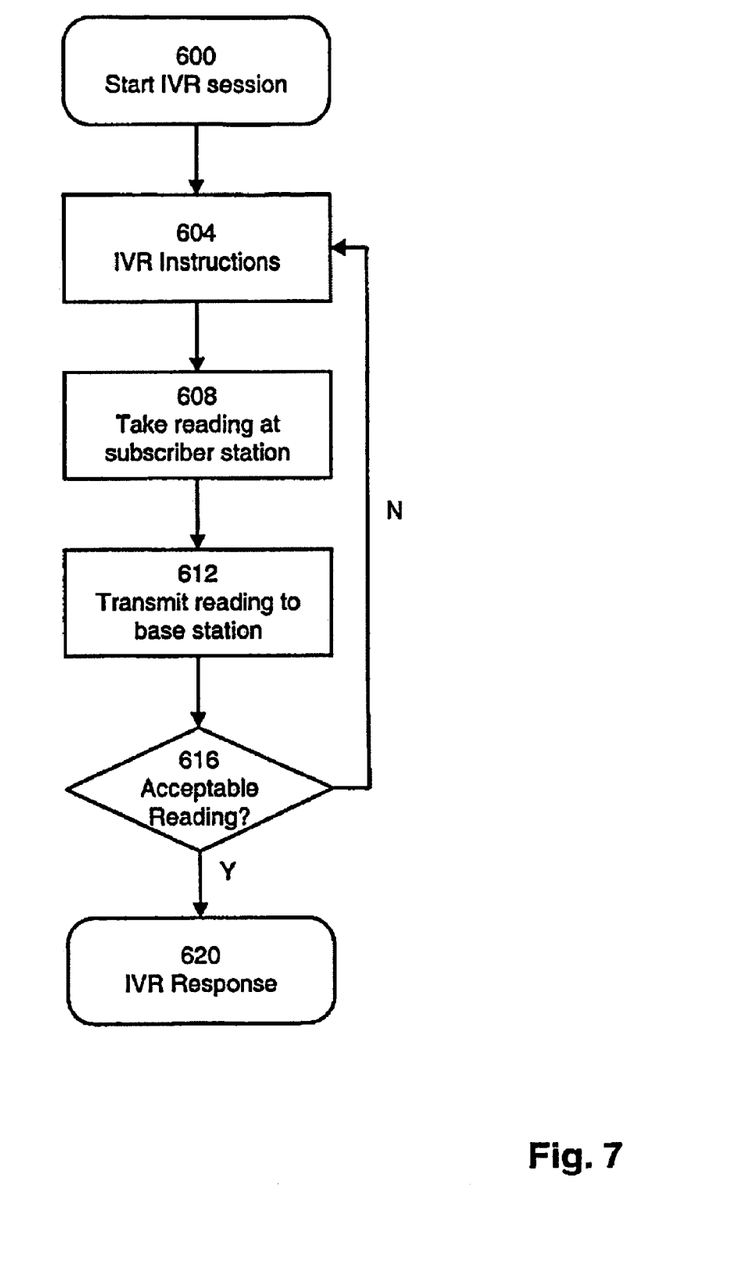
FIG. 7 shows a flowchart of a method for troubleshooting transception problems during the configuration stage in accordance with another embodiment of the invention.

While the flowchart of FIG. 7 shows the updating of code in subscriber station 24 all at once, it is contemplated that the code can also be updated at various times throughout the service configuration process (for example, when a new feature is activated in subscriber station 24 the code for that feature can be checked and updated if necessary).

In step 416, base station 40 transmits code updates, patches and/or new code to subscriber station 24 over radio link 36. In the present embodiment, the code for subscriber station 24 is provided by code server 52 via backhaul network 56. Examples of code that may be transferred include, but are not particularly limited to, new audio codecs and filters, software patches, firmware upgrades, audio recordings and prompts, and new telephony features. It is contemplated that, if desired, code can be temporarily cached in base station 40's storage unit 216 to reduce network traffic across backhaul network 56. The preferred protocol for data transfer between base station 40 and subscriber station 24 is Internet Protocol (IP), but other suitable protocols are also within the scope of the invention. The integrity of the transferred code can be verified using error detection and/or correction mechanisms that are well known to those of skill in the art, such as CRC's. Once the code has been successfully transmitted and validated, the method advances to step 420.

In step 420, IVR system 44 initiates a call to the new subscriber over radio link 36. Subscriber station 24 transmits a ring signal to telephony device 28, which will commonly be a telephone. Once the receiver on the telephone is picked up, the method advances to step 424. It is contemplated that, if the user does not answer the telephony device 28 within a predetermined time, the call will be aborted and will be re-attempted by base station 40 after a predetermined period of time elapsed.

In step 424, an IVR session is initiated between telephony device 28 and IVR system 44. Questions and/or instructions are transmitted from a programmed script in IVR system 44 to telephony device 28 and subscriber responses, in the form of DTMF tones generated on telephony device 28, are transmitted back to IVR system 44. Using these subscriber responses, IVR system 44 is able to generate a subscriber record for the new subscriber. The type of questions asked by IVR system 44 are not particularly limited, and can include, by way of example, topics such as credit card numbers, mailing address, and desired subscription features.

As an example of an IVR session, IVR system 44 can first greet the user and announce the identity of the network, i.e. "Welcome to the ACME Communications Network". Then the session will prompt the user for account setup information such as the user's name and the mailing address and/or billing information. One possible script could have the user first input their credit card number which would then be validated (at step 428). After the card number has been validated, the user would be prompted to see if they wished to use the same billing address as on the credit card. Once the account set up information has been obtained, the IVR session will proceed to configure subscription features, such as the number of different lines the user wishes to subscribe to, to select the telephone numbers for those lines, to select the desired services and features for each of those lines, etc.

The different types of subscription features that can be configured are not particularly limited and can include one or more of a plurality of the following options: voice quality service levels; data rate service levels; ringer tone selection; ringer volume control; time-of-day ringer volume control; voice mail; call waiting; call display; personal caller line identity (CLID); CLID suppression; telephone number selection; selection of public or private telephone listing; call forwarding; and many others. For example, IVR system 44 can provide the following, "To select Call Waiting as a feature, press '1' now", followed by, "To select Call Display, press '1' now". Other options or scripts are within the scope of the invention. Another example would be IVR system 44 playing a variety of musical 'ringer tones', after which, the user could select his or her preferred ringer tone.

It is also contemplated that the IVR system 44 can provide assistance with new subscribers setting up their hardware or configuring their services, as described below with reference to FIG. 8.

IVR system 44 can use either a linear or branching progression of its messages. For example, the user could press the '*' key to return to the beginning of the "Feature Selection menu" or press the '#' key to exit the menu and finish the call. It is further contemplated that IVR system 44 can redirect calls to a human service agent if desired or required. When the program on IVR system 44 is complete, the method advances to step 428, after providing a suitable message to the user indicating, for example, that the configuration process has been successfully completed.

In step 428, IVR system 44 transmits the new user profile information via backhaul network 56 to subscriber database 48, which updates its records. It is contemplated that the timing of this step is not particularly limited and can occur later in the method or simultaneously with the responses being entered in step 424. It is further contemplated that subscriber database 48 could validate the data received, such as checking area codes and addresses, or performing credit card authorization checks. Other types of data validation are within the scope of the invention.

The method advances to step 432, where subscriber database 48 checks to see if the new user profile is complete and all service configuration data has been successfully gathered. If the profile is complete and the service configuration data is correct, the method then advances to step 436. If either condition is not met, the method returns to step 424 to continue the IVR session. It is contemplated that, upon returning to step 420 IVR system 44 will ask questions specifically directed to completing the missing or incorrect user profile information rather than restarting the IVR session from the beginning.

Once the configuration process is determined at step 432 to be complete, at step 436 IVR system 44 terminates its call with telephony device 28 and the method advances to step 440.

In step 440, base station 40 is now ready to receive or accept transmissions from subscriber station 24 in accordance with the service provider's rules set for the subscriber's record and the method of service configuration is now complete.

While the embodiments discussed above relate to a presently preferred method for provisioning a subscriber, it is contemplated that variations in the order of steps and the specific steps and processes for provisioning a subscriber will occur to those of skill in the art and that such variations do not depart from the scope of the present invention.

In accordance with another embodiment of the invention, a method of connecting a subscriber station 24 to base station 40 will now be discussed with reference to the flowcharts shown in FIGS. 6a, 6b and with reference again to FIG. 5. In particular, in this method subscriber station 24 awaits contact from a base station 40 rather than proactively contacting base station 40.

Figure 6A:
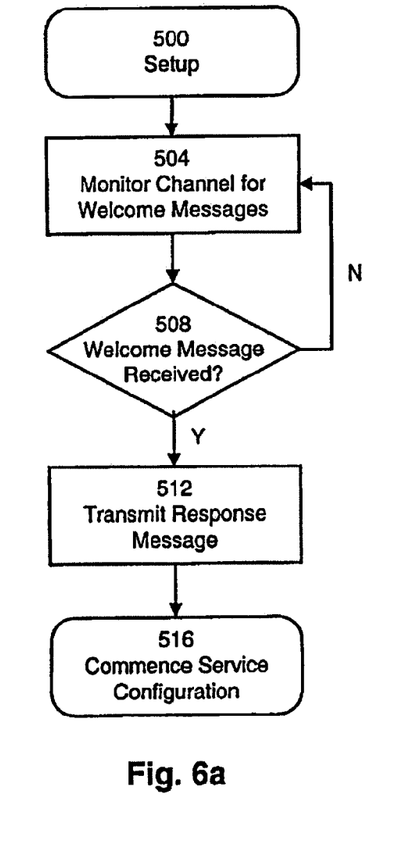
FIG. 6a shows a flowchart of a method for connecting a subscriber to a network, with reference to a subscriber station, in accordance with an embodiment of the present invention.

Specifically, referring now to FIG. 6a, the method of this embodiment commences at step 500 when the new subscriber first activates a properly set-up subscriber station 24 (i.e.—a telephony device 28 is attached to telephony port 120 and a power supply is connected and turned on). The properly set-up subscriber station 24 initializes (boots up and can perform a power-on self test and/or similar initialization activities) and begins to listen for one or more base stations 40, or sectors of a base station in a multi-sector configuration.

The method advances to step 504 where subscriber station 24 monitors a predefined channel or channels of one or more detected base stations 40 for welcome messages. The actual method of monitoring a predefined channel, or channels, for welcome messages is not particularly limited and, in a present embodiment of the invention, a software process, running on microprocessor-assembly 112 of subscriber station 24 will listen, after start up, for announcement messages transmitted on an appropriate channel.

The method advances to step 508 where a check is performed to determine if a welcome message is received at subscriber station 24. If a message has been received, the method moves to step 512. If no welcome message has been received, the method returns to step 504 and the monitoring process continues.

At step 512, subscriber station 24 opens a channel over radio link 36 with base station 40 and transmits an announcement message in response to the welcome message from the base station. In its response message, subscriber station 24 provides its serial number or another unique identifier.

The method then moves to step 516 and the service configuration process, as described in FIG. 5, begins.

Figure 6B:
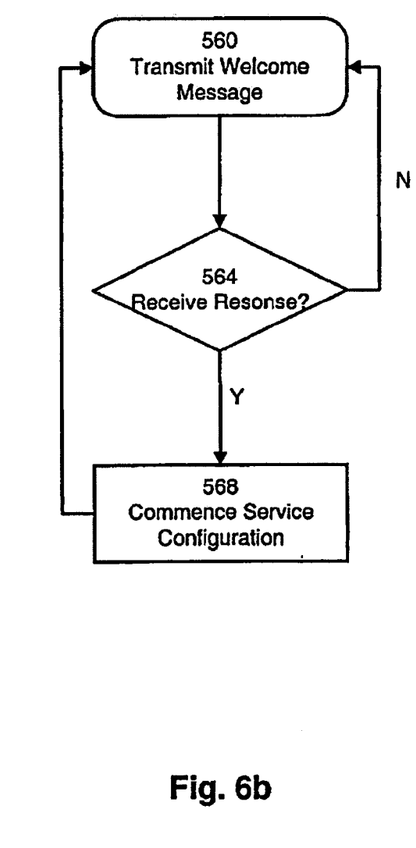
FIG. 6b shows a flowchart of a method for connecting a subscriber to a network, with reference to a base station, in accordance with an embodiment of the present invention.

Referring now to FIG. 6b, a method for transmitting a welcome message from base station 40 is indicated. Beginning at step 560, base station 40 transmits a broadcast welcome message over radio link 36 on a predetermined channel or channels. It is contemplated that the welcome message is transmitted at regular, periodic intervals. The actual method of transmitting a welcome message and its predefined channel structure is not particularly limited and, in the present embodiment of the invention, uses a RACH channel, similar to what is taught in the 3GPP specifications. Other suitable channels will occur to those of skill in the art.

The method advances to step 564. If base station 40 receives an appropriate response from subscriber station 24 within a predetermined period of time, the method advances to step 568. If not, the method returns to step 560.

At step 568, a communications channel is established with subscriber station 24 over radio link 36. The service configuration process begins, as described by the method described in FIG. 5. It is contemplated that aspects of the method, as described in FIGS. 6a and 6b can occur synchronously or asynchronously of each other, so that either aspect of the method could begin first.

One advantage provided by the method of FIGS. 6a and 6b is that it provides a method for a base station 40 to control when provisioning will be available to subscriber stations 24. For example, if base station 40 can only provision two subscriber stations 24 at a time, the transmission of welcome messages can be suspended while the two stations 24 are being provisioned and will be reinstated when at least one of those two stations 24 completes its provisioning and frees the provisioning and/or radio link resources of base station 40 and/or system 20 for provisioning another station 24.

A method in accordance with another embodiment of the invention is shown in the flow-chart of FIG. 7. The method of this embodiment provides an IVR service that assists new subscribers in system 20 in the placement/location of their subscriber station 24, either before, after or during provisioning, in order to provide improved transception quality. An IVR session is started at step 600. It is contemplated that this IVR session could be initiated as a regular part of the method described in FIGS. 4a, 4b and 5, or FIGS. 6a, 6b and 5, but other methods of initiating an IVR session could also be used, including having the subscriber station 24 initiate the method whenever its transception quality within system 20 falls below a selected level. In this latter case, subscriber station 24 can initiate a call to a telephony device 28 connected to telephony port 124 to commence the method.

The method advances to step 604 where, at a selected point during the IVR session, an IVR transception instruction is played, indicating that the transception assistance process will now commence.

The method then advances to step 608 where subscriber station 24 and the base station 40 measure the quality of the transception signal. Suitable means of measuring transception quality are known and any suitable metric for transception-quality can be used. For example, signal-to-noise ratio, emitted and/or received power level, bit error rate, frame error rate or combinations thereof in the uplink and/or the downlink of radio link 36 can be used.

The method advances to step 612 where the metrics determined by the subscriber station 24 in step 608 are transmitted to base station 40 via radio link 36, and from base station 40 are further transmitted to IVR system 44 along with the metrics determined by base station 40.

The method advances to step 616 where IVR system 44 compares the metrics against thresholds and if the metrics meet or exceed the appropriate threshold then the method advances to step 620. If the metrics taken are below a specified threshold then the method returns to step 604.

For example, the IVR instruction to the user of subscriber station 24 in step 604 could say, "We are presently receiving you at a level of four on a scale of one to ten. A performance improvement will be obtained if you can move your subscriber station to a location where a higher reception level can be achieved. Improvements can typically be obtained when the subscriber station is placed in a higher location, nearer to a window and/or away from large metal objects. Please reposition your subscriber station, press the '#' key and your reception level will be measured again or press '*' to complete this process".

It is contemplated that IVR system 44 plays the transception instructions in sequence, so that a first transception instruction, describing the process, is played the first time the method advances to step 604, and another transception instruction, such as the example given above, is played the second time the method advances to step 604, and so forth.

At step 620, IVR system 44 transmits a new message to subscriber station 24 indicating that the process has been completed.

As will be apparent to those of skill in the art, additional enhancements can be added to the methods of FIGS. 4a, 4b, 5, 6a, 6b, and 7. For example, it is contemplated that the transfer of code could occur more than one time within the method. For example, the code required to demonstrate a feature to a new user could be downloaded, as needed, over the course of the IVR session. Specifically, a user interested in a "voice disguise" function can be provided with the code to implement a demonstration version of that function, the code being deleted after a fixed number of uses or a fixed time period, etc. if the user chooses not to pay for the function. Alternatively, the user could download new ringer tones, based upon his or her menu selections.

It is further contemplated, that as a security measure, a user with an incomplete subscriber profile could still be allowed to call designated numbers, such as for emergency 911 calls, a "test" line to verify unit functionality, or to a customer help line.

It is further contemplated that, as a security measure, when assigning IP addresses in step 400, the assigned IP address can be restricted to limit access to specified destination addresses and that this IP address may be changed to an unrestricted IP address only upon successful completion of the provisioning process.

It is also contemplated that the method of assigning an IP address used by code server 52 could be adaptive to the configuration of the subscriber's data device, in accordance with the standards defined in IP version 6.

It is further contemplated that the creation or updating of a subscriber profile could be completed over the course of more than one IVR session, if the IVR session was terminated prematurely for any reason.

It is further contemplated that during the course of the IVR session, a user would be able to change input methods between a telephony device 28, such as a telephone, and an appropriate data device 32, such as a personal computer or personal digital assistant (PDA), to perform some portion of the service creation process. For example, service creation could begin using an IVR session over a telephone, with the user providing responses via DTMF tones. When the user has entered his or her credit card number, the user could have the option to complete his or her user profile, using a connected personal computer that can open an internet browser to an appropriate URL address, which contains one or more HTML-based forms.

It is further contemplated that the data device 32 used could be a personal computer or PDA for the entirety of the service creation process. The user would attach his or her appropriately configured data device 32 to subscriber station 24 via data port 120. The user would then open an internet browser to an appropriate URL address, which contains one or more HTML-based forms that would collect necessary information, including his or her credit card number.

It is also contemplated that the functionality of subscriber station 24 and telephony device 28 could be combined into a hybrid unit that would be a "smart" phone.

It is contemplated that the method described in FIG. 7 could be adapted so that the metrics transmitted determined by subscriber station 24 could determine other types of behavior on IVR system 44. For example, if it was determined that the best possible transception quality on subscriber station 24 did not meet certain predetermined requirements, then only certain types and levels of service would be offered during step 312 (subscriber configuration), i.e., if transception rates were poor then only "silver" or "bronze" levels of voice quality (using moderate and high compression rate voice codecs respectively) would be offered whereas if transception rates were excellent, then "gold" (using a low compression rate voice codec), "silver" or "bronze" levels can be offered.

It is further contemplated that the updating of code, described at step 414 and 416 of FIG. 5, can occur as a result of the inputs received during the IVR session, described at step 424. For example, a user could elect to hear a demonstration of "gold" voice service using DTMF tones. The voice codec for gold service would then be downloaded into subscriber station 24, which would then play an example of gold voice service over telephony device 28. Using DTMF tones, the user could then decide whether or not to subscribe to gold service. If the user declines, then the codec would be deleted from the storage unit 116 of subscriber station 24. Alternatively, instead of a demonstration of the gold service, the user could elect to use gold service for a time-limited basis. Other downloaded services, features and/or functions are within the scope of the invention.

It is further contemplated that the updating of code, described at step 414 and 416 could occur for an existing subscriber with a valid subscriber profile and record. For example, code could be downloaded to subscriber station 24 as part of a system-wide service upgrade.

It is further contemplated that if a user does not pick up the phone at step 420, subscriber station 24 could be programmed to play a message on telephony device 28 the next time a user does pick up the phone. This message could provide instructions on how to reconnect with the IVR session, such as by dialing a predetermined number. Other reconstruction instructions are within the scope of the invention.

It is further contemplated that a user can also access IVR system 44 at a later point in order to alter his or her user profile, to add/remove services or to change the billing address or method. For example, a user who had declined gold voice service could later choose to subscribe to that particular service. Other service alterations are within the scope of the invention.

It is further contemplated that IVR system 44 could be augmented by being connected to a call center with live operators. Alternatively, IVR system 44 could be replaced with live operators in a call center.

It is further contemplated that the subscriber features offered during step 424 could extend beyond traditional phone features. For example, users could select their data transfer rates or configure firewall protection for their data device 32. Another example would be to download software for an appropriately configured data device 32 (such as the latest version of an internet browser). Other subscriber features are within the scope of the invention.

It is further contemplated that the method described in step 7 could be adapted to provide assistance in configuring data services over data device 32.

It is further contemplated that the methods of service creation, as described in FIGS. 5 and 7 could be provided over other transmission mediums, such as a DSL line or CATV loop instead of, or in addition to, radio link 36 if subscriber station 24 includes a suitable modem for such transport media.

It is further contemplated that the 'listening' processes used in base station 40 and/or in subscriber station 24 of the system to hear announcement and welcome messages could be event-driven processes rather than active and continuous processes.

It is further contemplated that system 20 could use a combination of the method described in FIGS. 4a and 4b and the method described in FIGS. 6a and 6b. For example, during normal operating conditions, system 20 is operable to use the method described in FIGS. 4a and 4b. However, after a widespread service failure, system 20 would use the method described in FIGS. 6a and 6b, in order to avoid having its base station(s) 40 overloaded by all the subscriber stations 24 affected by the service outage.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A telecommunication system, comprising:
   at least one base station connected to a telecommunication network;
   at least one subscriber station operable to connect to said at least one base station and to establish a connection between a user device operably connected to said subscriber station and said telecommunication network connected to said at least one base station, said at least one subscriber station being provisioned in said telecommunication system;
   a subscriber database connected to said telecommunications network and configured to maintain a plurality of subscriber records that contain provisioning information for services, features, and account information for said at least one subscriber station; and
   an interactive response system operable, if said at least one base station has queried said subscriber database and found that a newly connected subscriber station does not have a corresponding subscriber record in said subscriber database, to create a new subscriber record in said subscriber database in response to input received over one of said connections from a said newly connected subscriber station using a corresponding user device to select said services, features, and account information for said newly connected subscriber station.

2. The telecommunications system as claimed in claim 1, wherein said connection between said at least one subscriber station and said at least one base station comprises a radio link.

3. The telecommunications system as claimed in claim 2, wherein said telecommunications system comprises a wireless local loop system.

4. The telecommunications system as claimed in claim 1, wherein said at least one base station initiates the creation of said subscriber record after detecting the presence of a newly connected subscriber station.

5. The telecommunications system as claimed in claim 1, wherein said interactive response system is operable to provide technical support to a user.

6. The telecommunications system as claimed in claim 5, wherein said technical support comprises the interactive response system performing a measurement of the operation of the connection and providing feedback to the user with respect to the measured operation.

7. The telecommunication system as claimed in claim 1, further operable to provide program code from said at least one base station to said at least one subscriber station for execution on said at least one subscriber station.

8. The telecommunications system as claimed in claim 7, wherein said provided program code comprises an update to program code already loaded into said each subscriber station.

9. The telecommunications system as claimed in claim 7, wherein necessary updates to said program code loaded into said each subscriber station are determined automatically and downloaded to said each subscriber station.

10. The telecommunications system as claimed in claim 7, wherein said provided program code is employed to implement optional features on said each subscriber station.

11. The telecommunications system as claimed in claim 10, wherein said optional features are offered to said each subscriber station by said interactive response system.

12. The telecommunications system as claimed in claim 11, wherein said optional features are offered for at least one of (i) a time-limited basis and (ii) a finite number of uses.

13. The telecommunications system as claimed in claim 1, wherein each said user device comprises a telephony device.

14. The telecommunications system as claimed in claim 13, wherein said interactive response system comprises an interactive voice response system.

15. The telecommunications system as claimed in claim 1, wherein each said user device comprises a data device.

16. The telecommunications system as claimed in claim 15, wherein said interactive response system comprises a web page server.

17. The telecommunications system as claimed in claim 1, wherein said interactive response system configures said services, features, and account information for more than one said user device connected to each said subscriber station.

18. The telecommunications system as claimed in claim 1, wherein said interactive response system is further operable to modify an existing subscriber record in said subscriber database to allow a user of a subscriber station to modify services and features provided by a subscriber station.

19. The telecommunication system as recited in claim 1, wherein said user device comprises a mobile device.

20. The telecommunication system as recited in claim 1, wherein said at least one subscriber station comprises a mobile subscriber station.

21. The telecommunication system as recited in claim 1, wherein said at least one subscriber station and said user device are combined in a mobile unit.

22. A method for configuring a new subscriber record in a subscriber database in a telecommunication system having a plurality of base stations and a plurality of subscriber stations each operable to connect to one of said base stations and to establish a connection between a user device operably connected to said each subscriber station and said telecommunication network connected to said one of said base stations, said plurality of subscriber stations being provisioned in said telecommunication system, comprising the steps of:
  (i) a user of one of said subscriber stations connecting the user device to said one of said subscriber stations and powering up said one of said subscriber stations;
  (ii) said one of said subscriber stations broadcasting an announcement message across a corresponding connection to one of said base stations;
  (iii) said one of said base stations within range receiving said announcement message;
  (iv) said one of said base stations querying said subscriber database to determine if said subscriber database contains a subscriber record corresponding to said one of said subscriber stations and, if it does not, then said one of said base stations initiating an interactive response system call to said one of said subscriber stations across said corresponding connection;
  (v) said user answering said call using said user device;
  (vi) if said user has answered said call, initiating a session with said interactive response system to obtain provisioning information for services, features, and account information for said one of said subscriber stations in response to user input; and
  (vii) said one base station transmitting said provisioning information to said subscriber database and said subscriber database updating its records by creating a subscriber record containing said provisioning information for said one of said subscriber stations.

23. The method as claimed in claim 22, wherein said interactive response system is operable to provide technical support to said user.

24. The method as claimed in claim 23, where said technical support is provided in step (vi), and wherein step (vi) comprises the sub-steps of
  (a) said one of said subscriber stations recording diagnostics information;
  (b) said one of said subscriber stations transmitting said diagnostics information to said one of said base stations;
  (c) said one of said base stations transmitting said diagnostics information to said interactive response system; and
  (d) said interactive response system providing responses based upon said diagnostics information.

25. The method as claimed in claim 24, wherein the sub-steps (a) through (d) are repeated to obtain a final solution.

26. The method as claimed in claim 25, wherein said diagnostics information relates to transception metrics.

27. The method as claimed in claim 22, further operable to provide program code from said one of said base stations to said one of said subscriber stations for execution on said one of said subscriber stations.

28. The method as claimed in claim 27, wherein said provided program code comprises an update to program code already loaded into said one of said subscriber stations.

29. The method as claimed in claim 28, wherein necessary updates to program code loaded into said one of said subscriber stations are determined automatically and downloaded to said one of said subscriber stations.

30. The method as claimed in claim 27, wherein said program code is employed to implement optional features on said one of said subscriber stations.

31. The method as claimed in claim 30, wherein said optional features are offered to said one of said subscriber stations by said interactive response system.

32. The method as claimed in claim 31, wherein said optional features are offered for at least one of (i) a time-limited basis, and (ii) a finite number of uses.

33. The method as claimed in claim 22 wherein said interactive response session indicated in step (vi) configures said subscriber record for more than one user device connected to said one of said subscriber stations.

34. The method as claimed in claim 22, wherein said announcement message includes a unique identifier corresponding to said one of said subscriber stations and said one of said base stations initiates an interactive response system call if upon querying said subscriber database it determines that said unique identifier does not correspond to a subscriber record in said subscriber database.

35. The method as claimed in claim 22, wherein said one of said subscriber stations upon powering up monitors a predefined channel for a welcome message from one of said base stations within range and does not broadcast said announcement message until said welcome message is received.

36. The method as recited in claim 22, wherein said one of said subscriber stations comprises a mobile subscriber station.

37. The method as recited in claim 22, wherein said user device comprises a mobile device.

38. The method as recited in claim 22, wherein the user device is connected to said one of said subscriber stations via a radio port.

39. The method as recited in claim 22, wherein said one of said subscriber stations and said user device are combined in a mobile unit.

40. A telecommunication system, comprising:
a plurality of base stations connected to a telecommunication network;
a plurality of subscriber stations each operable to connect to one of said base stations and to establish a connection between a user device operably connected to said each subscriber station and said telecommunication network connected to said one of said base stations;
a subscriber database connected to said telecommunications network and configured to maintain a plurality of subscriber records that contain provisioning information for corresponding ones of all of said plurality of subscriber stations that have been provisioned in said telecommunication system; and
an interactive response system operable, if said one of said base stations has queried said subscriber database and found that a subscriber station that has just powered up and connected with said one of said base stations does not have a corresponding subscriber record in said subscriber database, to create a new subscriber record in said subscriber database in response to input received over one of said connections from a said just connected subscriber station using a corresponding user device to provide said provisioning information for said just connected subscriber station,
wherein said one of said base stations queries said subscriber database before receiving any input from said just connected subscriber station.

41. The telecommunications system as claimed in claim 40, wherein said one of said connections between said corresponding subscriber station and said one of said base stations comprises a radio link.

42. The telecommunications system as claimed in claim 41, wherein said telecommunications system comprises a wireless local loop system.

43. The telecommunications system as recited in claim 40, wherein at least one of said subscriber stations and the corresponding user device are combined in a mobile unit.

* * * * *